US008923331B2

(12) United States Patent
Han et al.

(10) Patent No.: US 8,923,331 B2
(45) Date of Patent: Dec. 30, 2014

(54) SYSTEM AND METHOD FOR MEASUREMENT BANDWIDTH CONFIGURATION (71) Applicant: FutureWei Technologies, Inc., Plano, TX (US)

(72) Inventors: Jing Han, Shenzhen (CN); Xiang Chen, Lake Zurich, IL (US); Dengkun Xiao, Beijing (CN); Anjian Li, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 161 days.

(21) Appl. No.: 13/644,411

(22) Filed: Oct. 4, 2012

(65) Prior Publication Data
US 2013/0094381 A1 Apr. 18, 2013

Related U.S. Application Data (60) Provisional application No. 61/543,188, filed on Oct. 4, 2011.

(51) Int. Cl.
H04J 3/16 (2006.01)
H04W 24/10 (2009.01)

(52) U.S. Cl.
CPC .................................... H04W 24/10 (2013.01)
USPC ........... 370/468; 370/401; 370/338; 370/331; 370/332; 455/226.1

(58) Field of Classification Search
USPC .............................. 455/436, 226.1
See application file for complete search history.

(56) References Cited

U.S. PATENT DOCUMENTS

| | | | |
|---|---|---|---|
| 2007/0253386 A1 | 11/2007 | Li et al. | |
| 2009/0191863 A1* | 7/2009 | Kazmi | 455/424 |
| 2010/0255834 A1* | 10/2010 | Ishii | 455/424 |
| 2010/0323688 A1 | 12/2010 | Kazmi et al. | |
| 2012/0115463 A1* | 5/2012 | Weng et al. | 455/425 |
| 2012/0314604 A1* | 12/2012 | Siomina et al. | 370/252 |
| 2013/0033998 A1* | 2/2013 | Seo et al. | 370/252 |
| 2013/0235738 A1* | 9/2013 | Siomina et al. | 370/252 |
| 2013/0303170 A1* | 11/2013 | Siomina et al. | 455/436 |
| 2013/0308485 A1* | 11/2013 | Krishnamurthy et al. | 370/252 |
| 2014/0105166 A1* | 4/2014 | Yamada et al. | 370/329 |

FOREIGN PATENT DOCUMENTS

| | | |
|---|---|---|
| CN | 101064898 A | 10/2007 |
| CN | 101595746 A | 12/2009 |
| CN | 102098265 A | 6/2011 |

OTHER PUBLICATIONS

Notification of Transmittal of the International Search Report and the Written Opinion of the International Searching Authority, or the Declaration for PCT/CN2012/082541, mailed Feb. 7, 2013, 10 pages.
"LS on Signaling Intra/Inter-frequency Measurement Bandwidth," R2-081432, 3GPP TSG RAN WG2 Meeting #61bis, Shenzhen, China, Mar. 31-Apr. 4, 2008, 1 page.

(Continued)

Primary Examiner — Duc C Ho
(74) Attorney, Agent, or Firm — Slater & Matsil, L.L.P.

(57) ABSTRACT

Signaling a Reference Signal Received Power (RSRP) or Reference Signal Received Quality (RSRQ) measurement of a wireless channel is achieved by sending an measurement bandwidth (measbandwidth) indicator to a receiver that mandates a specific measurement bandwidth for performing the RSRP or RSRQ measurement. By virtue of receiving the measbandwidth indicator, the receiver is required to perform the RSRP or RSRQ measurement over a portion of the wireless channel that is equal to the measurement bandwidth specified by the measbandwidth indicator.

15 Claims, 4 Drawing Sheets (56) References Cited

OTHER PUBLICATIONS

"3rd Generation Partnership Project; Technical Specification Group Radio Access Network; Evolved Universal Terrestrial Radio Access (E-UTRA); Radio Resource Control(RRC); Protocol Specification (Release 9)," 3GPP TS 36.331 v9.3.0, Jun. 2010, 250 pages.

"3rd Generation Partnership Project; Technical Specification Group Radio Access Network; Evolved Universal Terrestrial Radio Access (E-UTRA); Radio Resource Control(RRC); Protocol Specification (Release 10)," 3GPP TS 36.331 v10.2.0, Jun. 2011, 294 pages.

"Issues on Narrow Measurement Bandwidth," R4-114243, TSG-RAN Working Group 4 Meeting #60, Athens, Greece, Aug. 22-26, 2011, 5 pages.

* cited by examiner

SYSTEM AND METHOD FOR MEASUREMENT BANDWIDTH CONFIGURATION

This application claims the benefit of U.S. Provisional Application No. 61/543,188 filed on Oct. 4, 2011, entitled "System and Method for Measurement Bandwidth Configuration," which is incorporated herein by reference as if reproduced in its entirety.

TECHNICAL FIELD

The present invention relates to systems and methods for wireless communications, and, in particular embodiments, to systems and methods for measurement bandwidth configuration.

BACKGROUND

Wireless heterogeneous networks (Het-Nets) generally include multiple types of access points (APs) that provide wireless access using various access technologies, e.g., wireless local area network (LAN), cellular, etc. In many Het-Nets, a User Equipment (UE) may establish access to a service using one access technology and then maintain access to that service when switching to another access technology. For instance, a UE may establish access to a service using a wireless LAN and maintain access to the service when switching from the wireless LAN to a cellular network. As another example, a Wide Area Network (WAN) may offer wireless coverage to a UE through macrocells, femtocells, and picocells in various coverage zones.

Oftentimes, UEs are mobile devices that periodically migrate from one coverage area (cell) to another, and consequently may switch from a source AP to a target AP using a defined protocol (e.g., handover or otherwise). In some cases, a UE may transition to a target AP upon determining that the target AP offers a stronger connection than the source AP. This determination may be based on an estimated signal quality or characteristic. To estimate the signal quality/characteristic offered by a potential target AP, the UE may take a Reference Signal Received Power (RSRP) and/or Reference Signal Received Quality (RSRQ) measurement of a reference or pilot signal transmitted by the target AP.

SUMMARY

Technical advantages are generally achieved, by preferred embodiments of the present invention which describe systems and methods for using historical data to decode wireless communications.

In accordance with an embodiment, a method for signaling a Reference Signal Received Power (RSRP) or Reference Signal Received Quality (RSRQ) measurement of a wireless channel is provided. In one example, the method includes identifying a measurement bandwidth for the RSRP or RSRQ measurement; and sending an indicator to a receiver that specifies the measurement bandwidth. By virtue of receiving the indicator, the receiver is required to perform the RSRP or RSRQ measurement over a portion of the wireless channel that is equal to the measurement bandwidth specified by the indicator. An apparatus is also provided for performing this method.

In accordance with another embodiment, another method for performing a RSRP or RSRQ measurement is provided. In this example, the method includes receiving an indicator that mandates a measurement bandwidth for performing the RSRP or RSRQ measurement in the wireless channel, and performing the RSRP or RSRQ measurement in accordance with the measurement bandwidth mandated by the indicator. In an embodiment, performing the RSRP or RSRQ measurement includes measuring a portion of the wireless channel having a width that is equal to the measurement bandwidth mandated by the indicator. A mobile device for performing this method is also provided.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of exemplary embodiments of the present invention are discussed in detail below. It should be appreciated, however, that the present invention provides many applicable inventive concepts that can be embodied in a wide variety of specific contexts. The exemplary embodiments discussed are merely illustrative of specific ways to make and use the invention, and are not intended to limit the scope of the invention. Exemplary embodiments may be directed toward Radio Resource Management (RRM) measurement in a wireless network (e.g., Het-Net or otherwise) with a system and method for measurement bandwidth configuration. Generally, an embodiment RRM measurement bandwidth configuration can mandate UE measurement behavior.

The portion of the target AP's assigned bandwidth (target carrier) over which the RSRP/RSRQ measurement is taken is known as the measurement bandwidth. Notably, the measurement bandwidth may be narrower or wider than the reference or pilot signal in conventional networks, as the width of the measurement bandwidth is determined largely by the UE. For instance, in conventional networks, serving APs may communicate an allowed measurements bandwidth (allowedMeasBandwidth) parameter to migrating UEs that specifies the maximum allowed measurement bandwidth for RSRP/RSRQ estimation in neighboring cells. Because the AllowedMeasBandwidth only specifies the maximum measurement bandwidth, each UE is free to select any measurement bandwidth that is equal to or smaller than the maximum measurement bandwidth specified by the Allowedmeasbandwidth parameter. Hence, the UEs have a significant amount of discretion in determining the measurement bandwidth in conventional networks.

One problem with this conventional approach is that the accuracy of the RSRP/RSRQ estimation may be adversely affected when the measurement bandwidth selected by the UE is too narrow. For instance, a measurement bandwidth that is too narrow may prevent the UE from accurately estimating interference, e.g., inter-cell-interference (ICI), from neighboring cells. This problem is exacerbated by the fact that UEs are oftentimes in a poor position to determine what measurement bandwidth will yield accurate RSRP/RSRQ estimation results. To wit, the UE may be unaware of the placement and/or width of interfering bands in relation to the target carrier as well as unaware of the width of the target carrier reference/pilot signal. Further, UEs may be incentivized to select narrower measurement bandwidths to save battery power. As such, a mechanism for controlling or mandating the measurement bandwidth used for RSRP/RSRQ estimation is desired.

Aspects of this disclosure provide a mechanism for mandating the measurement bandwidth used for RSRP/RSRQ estimation, which includes communicating a measurement bandwidth indicator (measbandwidth) indicator to the UE. The measbandwidth indicator may be referred to herein as measbandwidth (for short). In embodiments, the measbandwidth indicator is an information element (IE) that identifies a specific measurement bandwidth, including but not limited to 6, 15, 25, 50, 75, or 100 RBs. This specific measurement bandwidth (e.g., 6, 15, 25 RBs, etc.) is used by the UE during RSRP/RSRQ estimation. Specifically, the measbandwidth is distinguished from the Allowedmeasbandwidth parameter in that the measbandwidth mandates a specific measurement bandwidth that the UE must use during RSRP/RSRQ estimation, while the Allowedmeasbandwidth parameter merely establishes a maximum measurement bandwidth to use during RSRP/RSRQ estimation.

Figure 1:
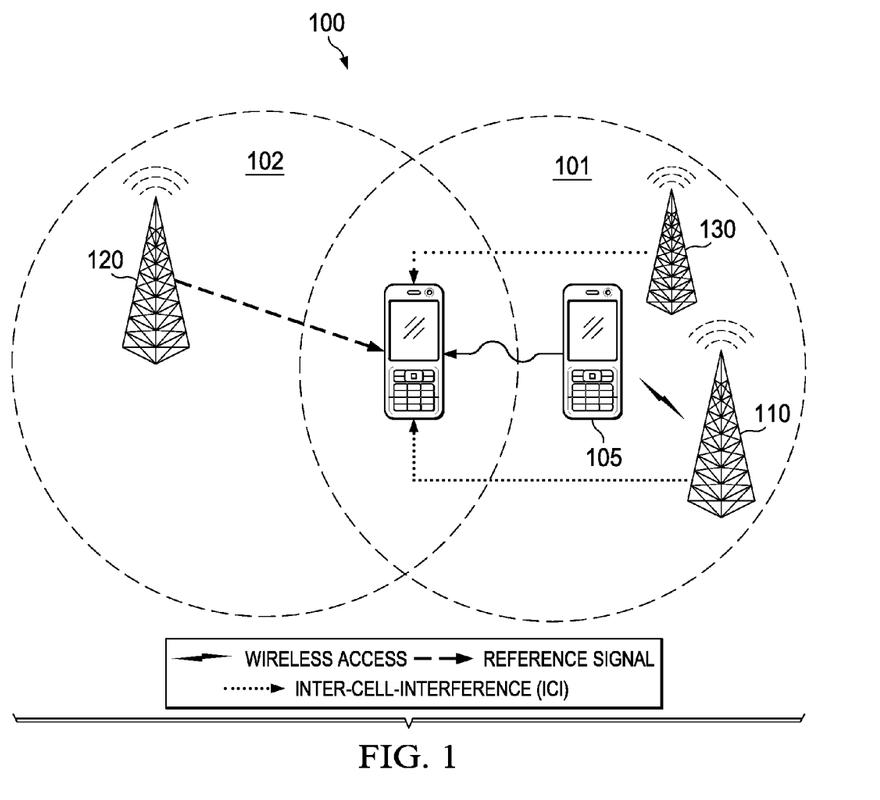
FIG. 1 illustrates an embodiment network for communicating data.

FIG. 1 illustrates a wireless network 100 comprising a source AP 110 for providing wireless access in a coverage area 101, a target AP 120 for providing wireless access in a coverage area 102, and a neighboring AP 130. The APs 110-130 may comprise any device capable of providing wireless access to a UE or mobile device, including base stations, enhanced node B (eNBs), home base stations, femto-cells, etc. Although the APs 110-130 are depicted as being located remotely from one another, one or more of the APs 110-130 may be collocated and/or share a common antenna. For instance, the AP 110 and AP 130 may be collocated and/or share a common antenna.

As shown, the UE 105 initially establishes a wireless access link (double arrow head) with the source AP 110, and thereafter migrates into the coverage area 102. The wireless access link may be any active or idle wireless connections that supports communication between the UE 105 and the source AP 110. For instance, the wireless access link may be an idle wireless connection configured to transport control and/or protocol information when the UE 105 is operating in an idle mode (e.g., an RRC_IDLE mode/state). Alternatively, the wireless access link may be an active wireless connection configured to transport, inter alia, data traffic when the UE 105 is operating in an active mode (e.g., an RRC_CONNECTED mode/state).

The UE 105 may migrate into a portion of the coverage area 102 that overlaps with the coverage area 101, and as a result may consider establishing a wireless access link (not shown) with the target AP 120. For instance, the UE 105 may transition from the source AP 110 to the target AP 120 when the target AP 120 provides a higher quality wireless connection. Accordingly, the UE 105 may perform an RSRP/RSRQ measurement on a reference signal provided by the target AP 120. The reference signal may be transmitted continuously by the target AP 120, and may span one or more RBs in the frequency band allocated to the target AP 120 (referred to herein as the target carrier). The source AP 110 and the AP 130 may have assigned bandwidths that overlap a portion of target carrier, and therefore wireless communications of the APs 110 and 130 may result in inter-cell interference (ICI) in one or more portions of the target carrier. In various embodiments, the RSRP/RSRQ measurement can be performed separately or both. The expression "RSRP/RSRQ" or "RSRP or RSRQ" presents both situations in which the measurement can be performed.

The measurement bandwidth in which the UE 105 uses to perform RSRP/RSRQ estimation may greatly affect the accuracy of that estimation. On one hand, a measurement bandwidth that is too narrow (e.g., fails to substantially capture ICI produced by the APs 110 and 130) may cause the resulting RSRP/RSRQ estimation to not adequately reflect the noise/interference in the channel. On the other hand, a measurement bandwidth that is too wide (e.g., exceeds the width of the reference signal) may capture portions of the target carrier that do not carry the reference signal, which will cause measurement error and lead to an inaccurate RSRQ estimation.

Figure 2:
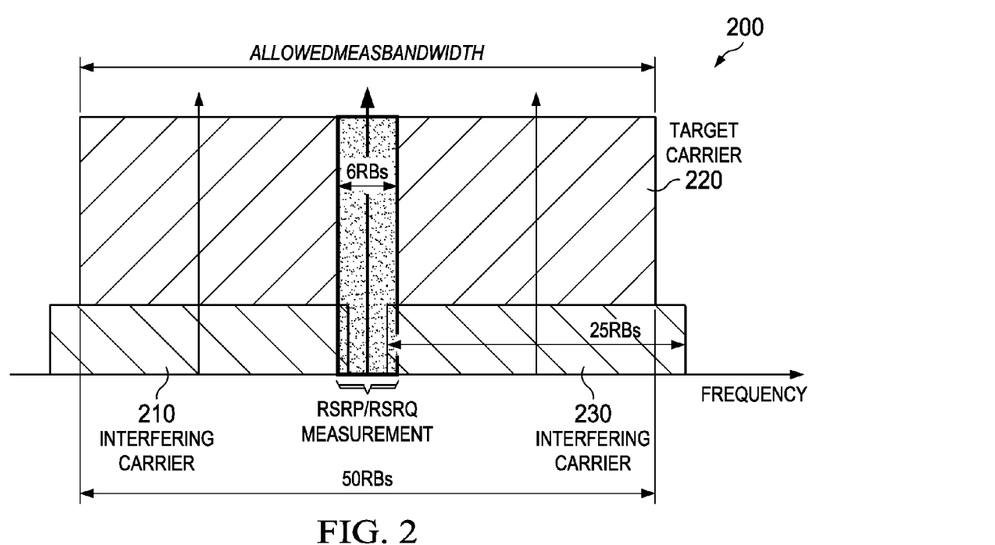
FIG. 2 illustrates a diagram of a conventional channel for communicating data.

FIG. 2 illustrates a diagram of a channel 200 for communicating data that relies on an Allowedmeasbandwidth indictor to establish RSRP/RSRQ estimation. As shown, the channel 200 includes a target carrier 220 and two interfering carriers 210 and 230. The target carrier 220 corresponds to a frequency carrier assigned to the target AP 120, while the interfering carriers 210 and 230 correspond to frequency carriers assigned to the APs 110 and 130. In the target carrier 220, the target AP 120 continuously or periodically transmits a reference signal. In some embodiments, the width of the reference signal may be equal to the width of the target carrier 220. In other embodiments, the width of the reference signal may be configurable by the target AP 120 or another network device (e.g., a central controller in accordance with network parameters and/or channel conditions. In addition, the serving AP 110 may communicate an Allowedmeasbandwidth indictor to roaming UEs that specifies a maximum allowed measurement bandwidth for which an RSRP/RSRQ measurement is performed. To wit, the roaming UEs may perform RSRP/RSRQ measurements over any portion of the target carrier 220 that is equal to or less than the maximum measurement bandwidth specified by the Allowedmeasbandwidth. For instance, if the Allowedmeasbandwidth specifies that the maximum measurement bandwidth is 50 RBs, then the UE may perform an RSRP/RSRQ measurement over any portion of the target carrier that is smaller than or equal to 50 RBs wide. For example, the UE may perform an RSRP/RSRQ measurement over a 6 RB central portion of the target carrier, as shown in FIG. 2. However, the 6 RB measurement depicted in FIG. 2 is merely an example, as the UE would have discretion to perform the RSRP/RSRQ measurement over a portion of the target carrier 220 that is less than or equal to the 50 RB width specified by the Allowedmeasbandwidth indicator.

The accuracy of the RSRP/RSRQ measurement may be substantially affected by the measurement bandwidth selected by the roaming UEs. For instance, a UE that selects a 6 RB wide measurement bandwidth may capture only a small portion (e.g., less than two RBs) of the interfering carriers 210 and 230 within the RSRP/RSRQ measurement. As a result, ICI from the interfering carriers 210 and 230 would likely be underrepresented in the RSRP/RSRQ estimation, causing the UE to potentially overestimate the connection quality offered by the target AP 120.

Figure 3:
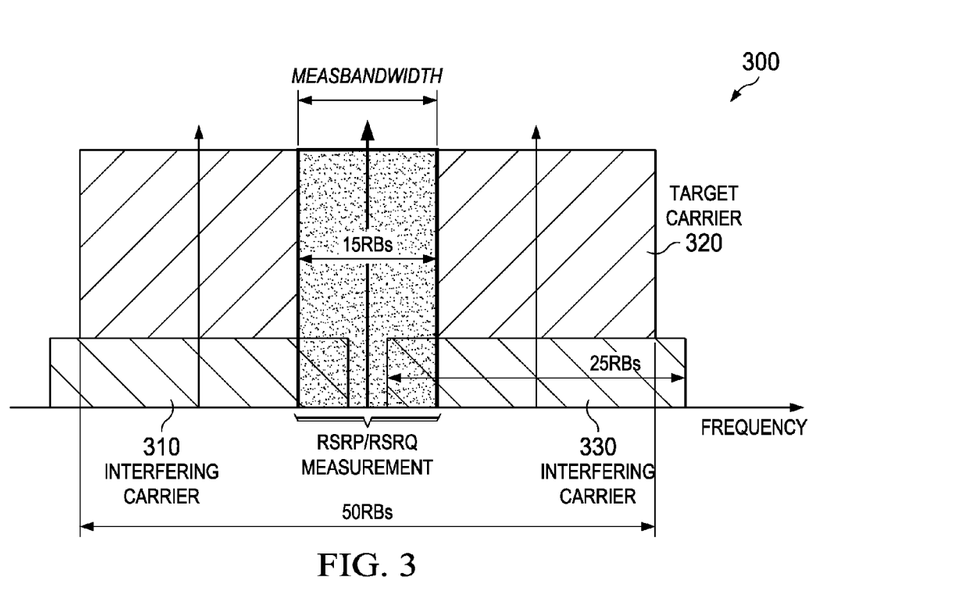
FIG. 3 illustrates a diagram of an embodiment channel for communicating data.

One solution to this problem is to communicate an indicator (e.g., measbandwidth) to roaming UEs that mandates a specific measurement bandwidth for performing RSRP/RSRQ estimation. In some embodiments, sending (or not sending) the indicator is optional and left to the discretion of the serving AP, target AP, or network administrator. FIG. 3 illustrates a diagram of a channel 300 for communicating data that relies on a measbandwidth indictor to establish RSRP/RSRQ estimation. Specifically, the channel 300 includes a target carrier 320 assigned to the target AP 120 and two interfering carriers 310 and 330 assigned to the APs 110 and 130. The target AP 120 continuously or periodically transmits a reference signal in the target carrier 320.

To facilitate RSRP/RSRQ estimation in the target carrier 320, the AP 120 may communicate an measbandwidth indictor to roaming UEs that specifies the measurement bandwidth (e.g., 6 RBs, 15 RBs, 25 RBs, etc.) for which an RSRP/RSRQ measurement is performed. Notably, the measurement bandwidth specified by the measbandwidth indictor is mandatory, once signaled to the roaming UE. To wit, roaming UEs are required to perform any RSRP/RSRQ measurement over a portion of the target carrier 220 that is equal to the measurement bandwidth specified by the measbandwidth. For instance, if the measbandwidth specifies that the measurement bandwidth is 15 RBs, then the UE must perform the RSRP/RSRQ measurement over a portion of the target carrier 320 that is 15 RBs wide. Hence, the measbandwidth indictor effectively regulates measurement bandwidth for RSRP/RSRQ estimation, thereby preventing inaccurate estimates that potentially result when the measurement bandwidth is too wide or too narrow.

Figure 4:
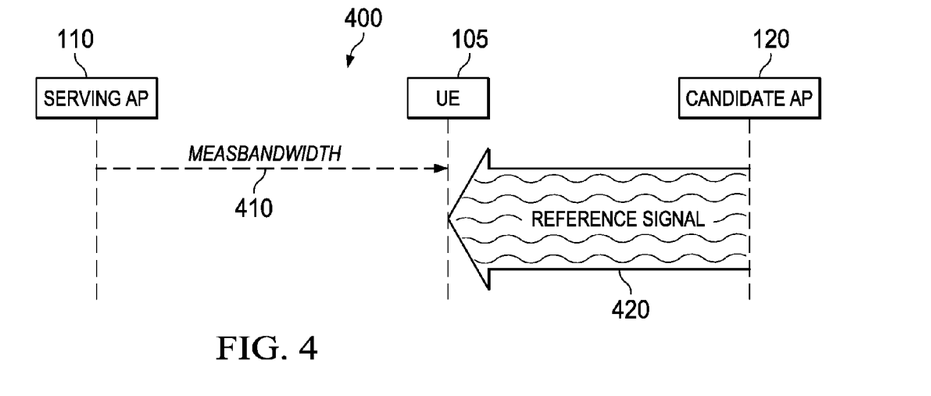
FIG. 4 illustrates a protocol diagram of an embodiment communication sequence for configuring an RSRP/RSRQ estimation.

FIG. 4 illustrates an embodiment communications sequence 400 for configuring an RSRP/RSRQ measurement. The communications sequence 400 begins when the serving AP 110 sends a measbandwidth 410 to the UE 105. In some embodiments, the measbandwidth 410 is periodically broadcast in a common channel (e.g., physical downlink shared control channel (PDSCH) by the serving AP 110. In the same or other embodiments, the measbandwidth 410 is communicated to the UE 105 in RRC dedicated signaling by the serving AP 110.

The measbandwidth 410 specifies a measurement bandwidth to use in performing RSRP/RSRQ measurement/estimation. By communicating the measbandwidth 410 to the UE 105, the serving AP 110 mandates the measurement bandwidth with which the UE 105 uses to perform RSRP/RSRQ measurement. Hence, unlike the Allowedmeasbandwidth parameter which merely specifies a maximum allowed measurement bandwidth (thereby giving the UE discretion to select any measurement bandwidth that is smaller than or equal to the maximum measurement bandwidth), the measbandwidth mandates a specific measurement bandwidth that the UE must use in obtaining the RSRP/RSRQ measurement. In embodiments, the measbandwidth may specify a number of RBs that carry reference signals transmitted by the candidate AP 120. Thereafter, the UE performs channel estimation on a reference signal 420 transmitted by a candidate/target AP 120. The reference signal 420 may be communicated continuously (or periodically) by the candidate/target AP 120, and may span the width of a target carrier associated with the candidate/target AP 120.

Figure 5:
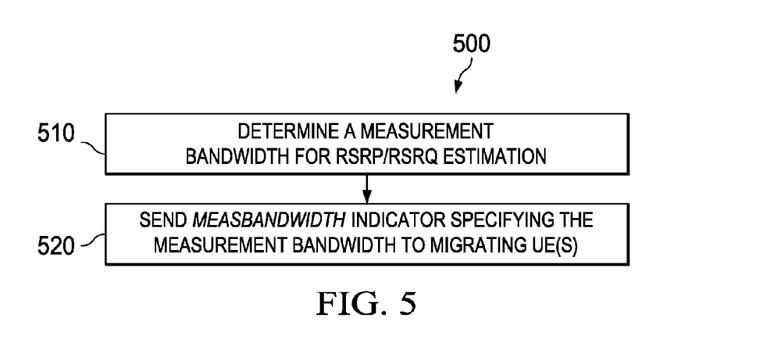
FIG. 5 illustrates a flowchart of an embodiment method for configuring an RSRP/RSRQ estimation.

FIG. 5 illustrates an embodiment method 500 for configuring an RSRP/RSRQ measurement, as may be performed by a serving AP. The method 500 begins at step 510, where the serving AP determines a measurement bandwidth for performing RSRP/RSRQ measurements in a target carrier (e.g., in a neighboring AP's channel). In some embodiments, the step of determining a measurement bandwidth may include computing or otherwise calculating a measurement bandwidth that will provide adequate RSRP/RSRQ. In other embodiments, the step of determining a measurement bandwidth may include simply identifying a measurement bandwidth computed by another entity (e.g., the target AP or otherwise). Next, the method 500 proceeds to step 520, where the serving AP communicates the measbandwidth to migrating UEs. The measbandwidth specifies the measurement bandwidth for performing RSRP/RSRQ measurements in the target carrier. Thereafter, the UE takes an RSRP/RSRQ measurement on a reference or pilot signal provided by a target or candidate AP.

Figure 6:
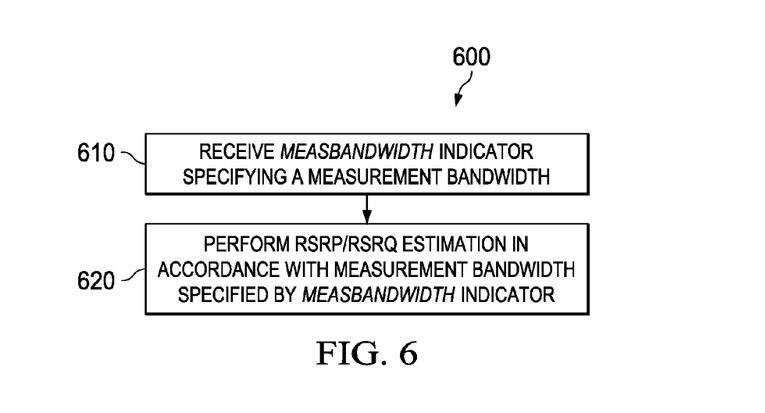
FIG. 6 illustrates a flowchart of an embodiment method for performing an RSRP/RSRQ estimation.

FIG. 6 illustrates an embodiment method 600 for performing an RSRP/RSRQ measurement, as may be performed by a mobile station or UE that migrates from one coverage area to another. The method 600 begins at step 610, where the UE receives a measbandwidth specifying the measurement bandwidth for performing RSRP/RSRQ measurements in the target carrier channel. Thereafter, the method 600 proceeds to step 620, where the UE performs the RSRP/RSRQ measurement in accordance with measurement bandwidth specified by measbandwidth indicator.

Evolved Universal Terrestrial Radio Access (E-UTRA) or evolved Universal Mobile Telecommunications System (UMTS) Terrestrial Radio Access Network (e-UTRAN) describes the air interface/radio access network (RAN) standards for the Third Generation Partnership Project (3GPP) Long Term Evolution (LTE) or LTE-Advanced (LTE-A) technical standards. Technical Specification (TS) 36.214 version 10.1.0 describes the definition of RSRQ measurements, and is incorporated by reference herein as if reproduced in its entirety. The TS 36.214 defines the RSRQ as the ratio N×RSRP/(E-UTRA carrier RSSI), where N is the number of RB's of the E-UTRA carrier RSSI measurement bandwidth. The measurements in the numerator and denominator shall be made over the same set of resource blocks.

E-UTRA Carrier Received Signal Strength Indicator (RSSI) comprises the linear average of the total received power (in watts) observed in orthogonal frequency division multiplexed (OFDM) symbols that contain reference symbols for antenna port 0, in the measurement bandwidth, over N number of resource blocks by the UE from all sources, including co-channel serving and non-serving cells, adjacent channel interference, thermal noise etc. If higher-layer signaling indicates certain subframes for performing RSRQ measurements, then RSSI is measured over all OFDM symbols in the indicated subframes.

The reference point for the RSRQ shall be the antenna connector of the UE. If receiver diversity is in use by the UE, the reported value shall not be lower than the corresponding RSRQ of any of the individual diversity branches. This is applicable to RRC_IDLE and RRC_CONNECTED, intra-frequency and inter-frequency.

In E-UTRA, multiple channel bandwidths such as 1.4, 3, 5, 10, 15 and 20 MHz are supported for the flexible deployment. The measurement bandwidth is defined in the existing Rel-8/9 specifications as follows. For neighboring cells, in RAN2 the measurement bandwidth is specified in the RRC layer specifications TS 36.331 version 10.2.0, which are incorporated herein by reference as if reproduced in their entirety. In the RRC layer specifications TS 36.331 version 10.2.0, the "Allowedmeasbandwidth" is introduced in the IE MeasObjectEUTRA. The IE AllowedMeasBandwidth is used to indicate the maximum allowed measurement bandwidth on a carrier frequency. The field does not dictate the measurement bandwidth but just indicates the maximum possible measurement bandwidth. That is to say, UE may use narrower measurement bandwidth, e.g., center 6 RB, since narrow measurement bandwidth could be helpful in mitigating power consumption and reducing UE processing complexity. The IE Allowedmeasbandwidth is applicable for intra-frequency or inter-frequency E-UTRA neighboring cells. With respect to measurement bandwidth for the serving cell, the IE dl-Bandwidth is introduced in MasterInformationBlock. Thus the UE would utilize the DL bandwidth for the RRM measurement, since the wider measurement bandwidth will introduce better accuracy benefits without introducing extra power consumption (as the UE receiver must receive over the whole DL bandwidth anyway).

In Het-Net and carrier aggregation scenarios, the possible deployments are described in R4-114243. Scenario 1 defined in R4-114243 is taken as an example. As shown in FIG. 1 in R4-114243, in this scenario, the serving E-UTRAN cell has 10 MHz channel bandwidth and the neighbor E-UTRAN cells have 5 MHz channel bandwidth in the same frequency band. The 10 MHz channel bandwidth corresponds to 50 RBs transmission bandwidth, and the 5 MHz channel bandwidth corresponds to 25 RBs transmission bandwidth. The relationship between channel bandwidth and transmission bandwidth introduces the gap between two E-UTRA neighboring cells. The gap approximately is 0.5 MHz. Thus 2*(0.54−0.25)=0.58 MHz (about 3.2 RBs) from the two 5 MHz channel bandwidths falls into the center 6 RBs bandwidth.

When 50 RBs measurement bandwidth is applied, the RSSI takes into account the received power from the serving cell with 50 RBs transmission bandwidth, the received interference power from the two neighboring cells with 25 RBs transmission bandwidth, and the thermal noise in the 50 RBs measurement bandwidth. Whereas when the 6 RBs measurement bandwidth is applied, the RSSI comprises the received power on the center 6 RBs from the serving cell, the received interference power on the 0.58 MHz bandwidth which falls into the center 6 RBs from the two neighboring cells, and the thermal noise. Some RSRP values of serving cell and two neighboring cells are assumed as shown in table 1. The corresponding RSRQ calculation results are also given in Table 1 below.

TABLE 1

| | | | | |
|---|---|---|---|---|
| RSRP_serving cell (dBm) | −85 | −90 | −90 | −90 |
| RSRP_neighbor cell (dBm) | −90 | −90 | −87 | −85 |
| RSRQ with 50RBs measurement bandwidth (dB) | −11.93 | −13.68 | −15.39 | −16.80 |
| RSRQ with 6RBs measurement bandwidth (dB) | −11.47 | −12.65 | −13.94 | −15.08 |

Based on the numerical results, the difference of measurement bandwidth could be approximately 1.72 dB under one scenario. It can be foreseen that the difference would become larger when the neighbor cells are UTRA cells as described in R4-114243 since both interference UTRA neighboring cells have only 3.84 MHz signals, and there would be no ICI present in the center 6 RBs.

According to the above analysis, UE would misjudge the interference from neighboring cells with narrow measurement bandwidth, i.e., the RSRQ measurement results will be optimistic under certain scenarios when 6 RBs measurement bandwidth is applied.

The existing IE "AllowedMeasBandwidth" is as follows. IE AllowedMeasBandwidth is used to indicate the maximum allowed measurement bandwidth on a carrier frequency as defined by the parameter Transmission Bandwidth Configuration "$N_{RB}$" in $_{TS}$ 36.104, which is incorporated herein by reference as if reproduced in its entirety. The values mbw6, mbw15, mbw25, mbw50, mbw75, mbw100 indicate 6, 15, 25, 50, 75 and 100 resource blocks respectively.

| AllowedMeasBandwidth information element |
|---|
| -- ASN1START |
| AllowedMeasBandwidth ::= ENUMERATED {mbw6, mbw15, mbw25, mbw50, mbw75, mbw100} |
| -- ASN1STOP |

The existing IE "MeasObjectEUTRA" is as follows. The IE MeasObjectEUTRA specifies information applicable for intra-frequency or inter-frequency E-UTRA cells.

| MeasObjectEUTRA information element | | | |
|---|---|---|---|
| -- ASN1START | | | |
| MeasObjectEUTRA ::= | SEQUENCE { | | |
|   carrierFreq | ARFCN-ValueEUTRA, | | |
|   allowedMeasBandwidth | AllowedMeasBandwidth, | | |
|   presenceAntennaPort1 | PresenceAntennaPort1, | | |
|   neighCellConfig | NeighCellConfig, | | |
|   offsetFreq | Q-OffsetRange | DEFAULT dB0, | |
|   -- Cell list | | | |
|   cellsToRemoveList | CellIndexList | OPTIONAL, | -- Need ON |
|   cellsToAddModList | CellsToAddModList | OPTIONAL, | -- Need ON |
|   -- Black list | | | |
|   blackCellsToRemoveList | CellIndexList | OPTIONAL, | -- Need ON |
|   blackCellsToAddModList | BlackCellsToAddModList | OPTIONAL, | -- Need ON |
|   cellForWhichToReportCGI | PhysCellId | OPTIONAL, | -- Need ON |
|   ..., | | | |
|   [[measCycleSCell-r10 | MeasCycleSCell-r10 | OPTIONAL, -- Need ON | |
|     measSubframePatternConfigNeigh-r10 | MeasSubframePatternConfigNeigh-r10 | OPTIONAL | |
|     -- Need ON | | | |
|   ]] | | | |
| } | | | |

For the measurement bandwidth for the neighbor cells, the network could signal the wider measurement bandwidth information to UE for the neighboring cell measurements when the wider measurement bandwidth is needed. UE would apply the signaled measurement bandwidth. Thus some changes in RAN2 specification TS 36.331 may be implemented as follows.

In one embodiment, the "Allowedmeasbandwidth" in IE "MeasObjectEUTRA" is changed to the "measbandwidth" which specifies measurement bandwidth applicable for the E-UTRA cells. UE shall apply the "measbandwidth". In the certain deployment, "measbandwidth" is set to the wider bandwidth. The IE MeasBandwidth is used to indicate the measurement bandwidth on a carrier frequency as defined by the parameter Transmission Bandwidth Configuration "NRB" TS 36.104. The values mbw6, mbw15, mbw25, mbw50, mbw75, mbw100 indicate 6, 15, 25, 50, 75 and 100 resource blocks respectively.

"measbandwidth" specifies measurement bandwidth applicable for the E-UTRA neighboring cells. The IE "measbandwidth" is defined as follows. The IE MeasBandwidth is used to indicate the measurement bandwidth on a carrier frequency as defined by the parameter Transmission Bandwidth Configuration "NRB" TS 36.104. The values mbw6, mbw15, mbw25, mbw50, mbw75, mbw100 indicate 6, 15, 25, 50, 75 and 100 resource blocks respectively.

| MeasBandwidth information element |
| --- |
| -- ASN1START |
| MeasBandwidth ::=    ENUMERATED {mbw6, mbw15, mbw25, mbw50, mbw75, mbw100} |
| -- ASN1STOP |

| MeasBandwidth information element |
| --- |
| -- ASN1START |
| MeasBandwidth ::=    ENUMERATED {mbw6, mbw15, mbw25, mbw50, mbw75, mbw100} |
| -- ASN1STOP |

The IE MeasObjectEUTRA specifies information applicable for intra-frequency or inter-frequency E-UTRA cells.

| MeasObjectEUTRA information element |
| --- |
| -- ASN1START |
| MeasObjectEUTRA ::=    SEQUENCE { |
|     carrierFreq              ARFCN-ValueEUTRA, |
|     MeasBandwidth    MeasBandwidth, |
|     presenceAntennaPort1     PresenceAntennaPort1, |
|     neighCellConfig          NeighCellConfig, |
|     offsetFreq               Q-OffsetRange            DEFAULT dB0, |
|     -- Cell list |
|     cellsToRemoveList        CellIndexList            OPTIONAL,    -- Need ON |
|     cellsToAddModList        CellsToAddModList        OPTIONAL,    -- Need ON |
|     -- Black list |
|     blackCellsToRemoveList   CellIndexList            OPTIONAL,    -- Need ON |
|     blackCellsToAddModList   BlackCellsToAddModList   OPTIONAL,    -- Need ON |
|     cellForWhichToReportCGI  PhysCellId               OPTIONAL,    -- Need ON |
|     ..., |
|     [[measCycleSCell-r10     MeasCycleSCell-r10       OPTIONAL,    -- Need ON |
|         measSubframePatternConfigNeigh-r10   MeasSubframePatternConfigNeigh-r10   OPTIONAL |
|         -- Need ON |
|     ]] |
| } |

In another embodiment, IE "measbandwidth" is added to IE "MeasObjectEUTRA."

The IE MeasObjectEUTRA specifies information applicable for intra-frequency or inter-frequency E-UTRA cells.

| MeasObjectEUTRA information element |
| --- |
| -- ASN1START |
| MeasObjectEUTRA ::=    SEQUENCE { |
|     carrierFreq              ARFCN-ValueEUTRA, |
|     allowedMeasBandwidth     AllowedMeasBandwidth,    optional, |
|     measurebandwidth         measurebandwidth         OPTIONAL, |
|     presenceAntennaPort1     PresenceAntennaPort1, |
|     neighCellConfig          NeighCellConfig, |
|     offsetFreq               Q-OffsetRange            DEFAULT dB0, |
|     -- Cell list |
|     cellsToRemoveList        CellIndexList            OPTIONAL,    -- Need ON |
|     cellsToAddModList        CellsToAddModList        OPTIONAL,    -- Need ON |
|     -- Black list |
|     blackCellsToRemoveList   CellIndexList            OPTIONAL,    -- Need ON |
|     blackCellsToAddModList   BlackCellsToAddModList   OPTIONAL,    -- Need ON |
|     cellForWhichToReportCGI  PhysCellId               OPTIONAL,    -- Need ON |
|     ..., |
|     [[measCycleSCell-r10     MeasCycleSCell-r10       OPTIONAL,    -- Need ON |
|         measSubframePatternConfigNeigh-r10   MeasSubframePatternConfigNeigh-r10   OPTIONAL |

```
        -- Need ON
    ]]
}
```

Figure 7:
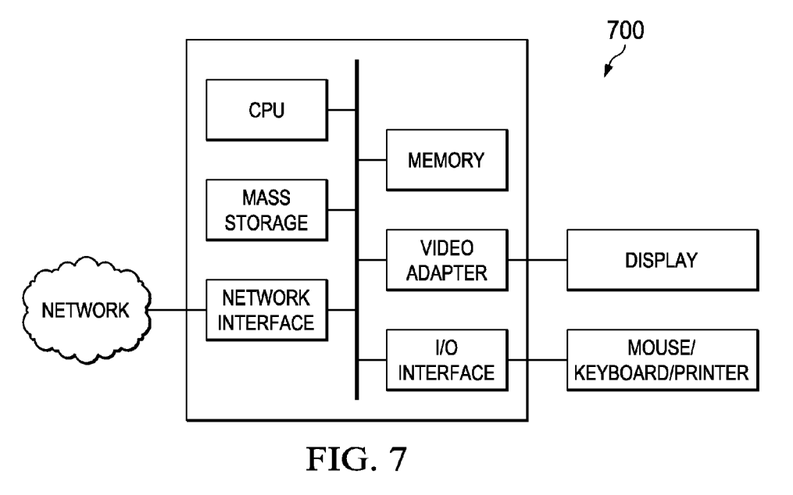
FIG. 7 illustrates a block diagram of an embodiment processing system.

FIG. 7 illustrates a block diagram of a processing system 700 that may be used for implementing the network devices and methods disclosed herein. Specific devices may utilize all of the components shown, or only a subset of the components, and levels of integration may vary from device to device. Furthermore, a device may contain multiple instances of a component, such as multiple processing units, processors, memories, etc. The processing system may comprise a processing unit equipped with one or more input/output devices, such as a speaker, microphone, mouse, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 8:
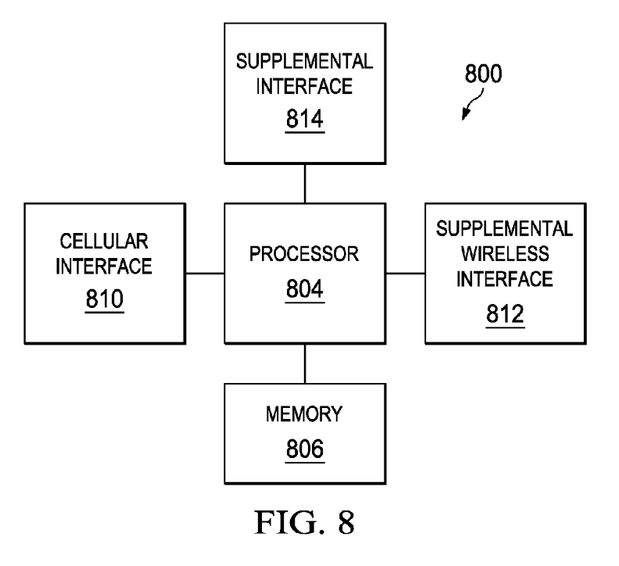
FIG. 8 illustrates a block diagram of an embodiment communications device.

FIG. 8 illustrates a block diagram of an embodiment of a communications device 800, which may be equivalent to one or more devices (e.g., UEs, eNBs, etc.) discussed above. The communications device 800 may include a processor 804, a memory 806, a cellular interface 810, a supplemental wireless interface 812, and a supplemental interface 814, which may (or may not) be arranged as shown in FIG. 8. The processor 804 may be any component capable of performing computations and/or other processing related tasks, and the memory 806 may be any component capable of storing programming and/or instructions for the processor 804. The cellular interface 810 may be any component or collection of components that allows the communications device 800 to communicate using a cellular signal, and may be used to receive and/or transmit information over a cellular connection of a cellular network. The supplemental wireless interface 812 may be any component or collection of components that allows the communications device 800 to communicate via a non-cellular wireless protocol, such as a Wi-Fi or Bluetooth protocol, or a control protocol. The supplemental interface 814 may be component or collection of components that allows the communications device 800 to communicate via a supplemental protocol, including wire-line protocols. In embodiments, the supplemental interface 814 may allow the device 800 to communicate with a backhaul network.

The following references are related to subject matter of the present application, and are incorporated herein by reference in its entirety: 3GPP TS 36.331-a20 entitled "Radio Resource Control (RRC) (Release 10)"; R4-114243 entitled "Issues on narrow measurement bandwidth," NTT DOCOMO; R2-081432 entitled "LS on signaling Intra/Inter-frequency measurement bandwidth," NTT DOCOMO; and 3GPP TS 36.331-930 entitled "Radio Resource Control (RRC) (Release 9)."

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for signaling a measurement of a wireless channel, the method comprising:
    identifying a measurement bandwidth for a Reference Signal Received Power (RSRP) or Reference Signal Received Quality (RSRQ) measurement; and
    sending an indicator to a receiver that specifies the measurement bandwidth, wherein the indicator requires the receiver to perform the RSRP or RSRQ measurement over a portion of the wireless channel that is equal to the measurement bandwidth specified by the indicator,
    wherein the indicator is a measurement bandwidth (measbandwidth) indicator that specifies an exact number of resource blocks (RBs) over which the RSRP or RSRQ measurement is performed, and
    wherein the measbandwidth indicator prohibits the RSRP or RSRQ measurement from being performed over fewer RBs than specified by the measbandwidth indicator.

2. The method of claim 1, wherein the measbandwidth indicator is a field in a measurement object Evolved Universal Terrestrial Radio Access (MeasobjectEUTRA) information element (IE).

3. The method of claim 1, wherein the measbandwidth indicator specifies that the measurement bandwidth is applicable for at least one of Evolved Universal Terrestrial Radio Access (E-UTRA) cells and Universal Terrestrial Radio Access (UTRA) cells.

4. The method of claim 1, wherein the measbandwidth indicator prohibits the RSRP or RSRQ measurement from being performed over more RBs than specified by the measbandwidth indicator.

5. The method of claim 1, wherein the measbandwidth indicator specifies an exact number of resource blocks (RBs) over which the RSRP or RSRQ measurement is performed such that the RSRP or RSRQ measurement cannot be performed over fewer RBs than is specified by the measbandwidth indicator.

6. An access point (AP) comprising:
a processor; and
a computer readable storage medium storing programming for execution by the processor, the programming including instructions to:
identify a measurement bandwidth for a Reference Signal Received Power (RSRP) or Reference Signal Received Quality (RSRQ) measurement in a wireless channel; and
send an indicator to a receiver that specifies the measurement bandwidth, wherein the indicator mandates that the receiver perform the RSRP or RSRQ measurement over a portion of the wireless channel that is equal to the measurement bandwidth specified by the indicator, wherein the indicator is a measurement bandwidth (measbandwidth) indicator, and wherein the measbandwidth indicator specifies an exact number of resource blocks (RBs) over which the RSRP or RSRQ measurement is performed such that the RSRP or RSRQ measurement is not performed over more or fewer RBs than specified by the measbandwidth indicator.

7. The AP of claim 6, wherein the measbandwidth indicator specifies a number of resource blocks (RBs) over which the RSRP or RSRQ measurement is performed.

8. The AP of claim 6, wherein the measbandwidth indicator prohibits the RSRP or RSRQ measurement from being performed over fewer RBs than specified by the measbandwidth indicator.

9. A method for performing a measurement in a wireless channel, the method comprising:
receiving an indicator that mandates a measurement bandwidth for performing a Reference Signal Received Power (RSRP) or Reference Signal Received Quality (RSRQ) measurement in the wireless channel; and
performing the RSRP or RSRQ measurement in accordance with the measurement bandwidth mandated by the indicator,
wherein performing the RSRP or RSRQ measurement in accordance with the measurement bandwidth mandated by the indicator comprises measuring a portion of the wireless channel having a width that is equal to the measurement bandwidth mandated by the indicator,
wherein the indicator is a measurement bandwidth (measbandwidth) indicator, and
wherein the measbandwidth indicator specifies an exact number of resource blocks (RBs) over which the RSRP or RSRQ measurement is performed such that the RSRP or RSRQ measurement cannot be performed over more RBs than is specified by the measbandwidth indicator.

10. The method of claim 9, wherein the measbandwidth indicator is a field in a measurement object Evolved Universal Terrestrial Radio Access (MeasobjectEUTRA) information element (IE).

11. The method of claim 9, wherein the measbandwidth indicator specifies that the measurement bandwidth is applicable for Evolved Universal Terrestrial Radio Access (E-UTRA) cells.

12. The method of claim 9, wherein the measbandwidth indicator prohibits the RSRP or RSRQ measurement from being performed over fewer RBs than specified by the measbandwidth indicator.

13. A mobile device comprising:
a processor; and
a computer readable storage medium storing programming for execution by the processor, the programming including instructions to:
receive an indicator that mandates a measurement bandwidth for performing a Reference Signal Received Power (RSRP) or Reference Signal Received Quality (RSRQ) measurement in a wireless channel, wherein the indicator is a measurement bandwidth (measbandwidth) indicator, and wherein the measbandwidth indicator specifies an exact number of resource blocks (RBs) over which the RSRP or RSRQ measurement must be performed such that the RSRP or RSRQ measurement cannot be performed over more or fewer RBs than specified by the measbandwidth indicator; and
perform the RSRP or RSRQ in accordance with the measurement bandwidth mandated by the indicator,
wherein the instructions to perform the RSRP or RSRQ in accordance with the measurement bandwidth mandated by the indicator include instructions to measure a portion of the wireless channel having a width that is equal to the measurement bandwidth mandated by the indicator.

14. The mobile device of claim 13, wherein the measbandwidth indicator specifies an exact number of resource blocks (RBs) over which the RSRP or RSRQ measurement must be performed.

15. The mobile device of claim 13, wherein the measbandwidth indicator prohibits the RSRP or RSRQ measurement from being performed over fewer RBs than specified by the measbandwidth indicator.

* * * * *